April 16, 1940.   R. L. KOEPPEN ET AL   2,197,583
BRAKE MECHANISM
Filed Aug. 13, 1936
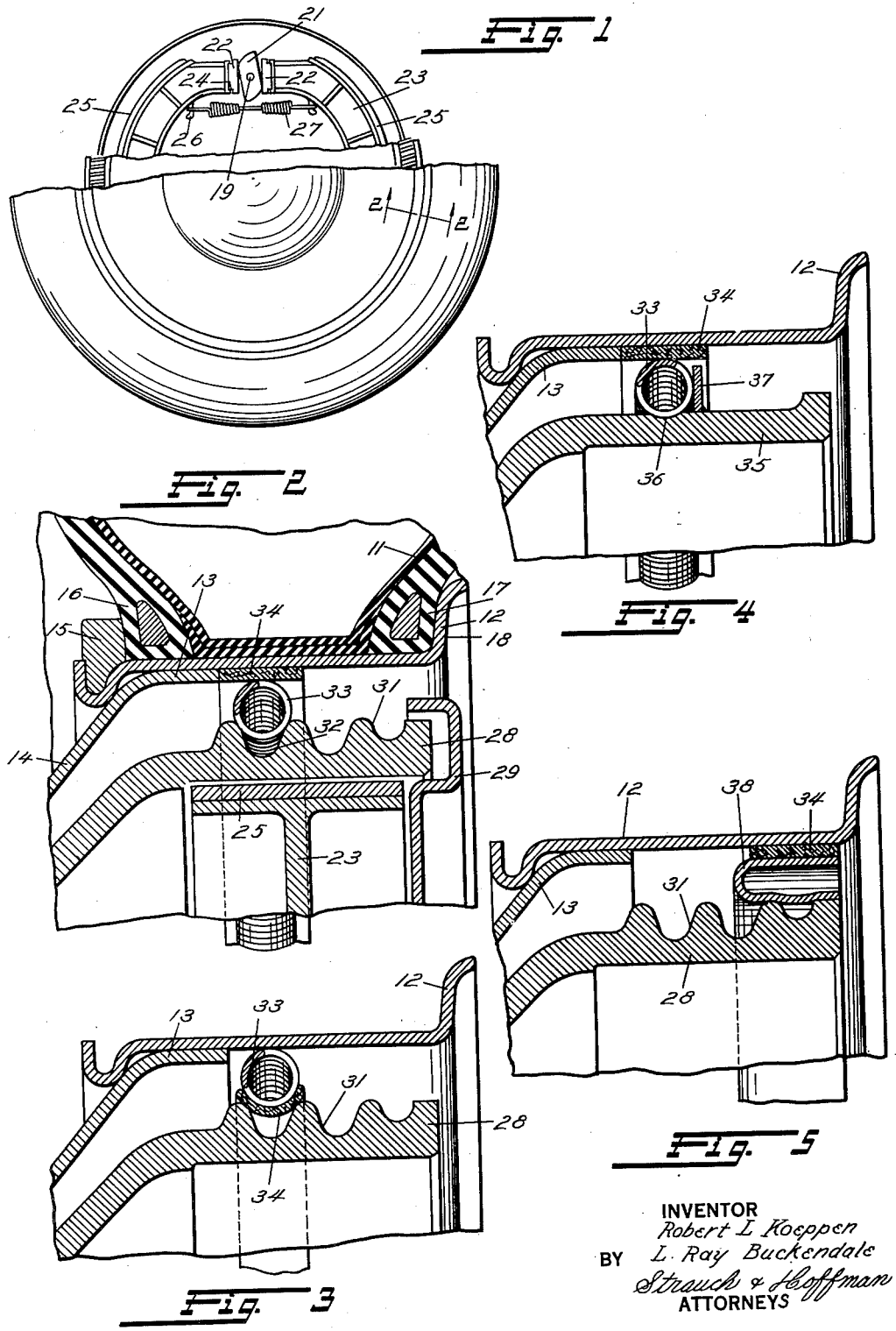
INVENTOR
Robert L. Koeppen
BY L. Ray Buckendale
Strauch & Hoffman
ATTORNEYS Patented Apr. 16, 1940

2,197,583

UNITED STATES PATENT OFFICE 2,197,583

BRAKE MECHANISM

Robert L. Koeppen and Lawrence Ray Buckendale, Detroit, Mich., assignors to The Timken-Detroit Axle Company, Detroit, Mich., a corporation of Ohio Application August 13, 1936, Serial No. 95,882

11 Claims. (Cl. 301—6)

This invention relates to brake mechanisms, especially as employed in connection with motor vehicles, and is particularly directed to means for eliminating chatter and so-called squealing of brake mechanisms when operated.

As is well known, the chief cause of undesirable noise such as chatter or squeal in connection with the operation of brakes is the vibrations that are generated therein. Such vibrations and their resultant noises are particularly characteristic of brakes of the type employed in combination with relatively heavy vehicles such as trucks and buses. Despite extreme care and precision in workmanship and in the selection of materials, the vibrations, which set up annoying sounds, have not been eliminated to a desired extent by reason of the warping of the drums and linings as a result of excessive heat generated when the brakes are operated.

In solving this problem of noise in brakes, it is a major object of this invention to provide novel means wherein vibrations generated in the braking mechanism are dampened or intercepted and dissipated before they are amplified in the axle or body of the vehicle or like mounting despite any warping of the brake drum and lining employed in combination therewith.

It is a further object of this invention to provide novel means in combination with a brake assembly wherein the high frequency vibrations generated therein, chiefly responsible for the chatter and squeal incident to operation of the brake, are transferred from the brake assembly and dissipated.

A further object of this invention is the provision of novel means in combination with a brake and wheel assembly wherein means is provided to absorb and dissipate vibrations of substantially all frequencies that give rise to undesirable brake noises.

Still a further object of the present invention resides in the provision of novel means in combination with a brake and wheel assembly on an automotive vehicle wherein the vibrations generated in the brake assembly which would normally give rise to annoying noises are conducted from the brake to the wheel where they are absorbed by the tire and its supporting means.

A further object of the present invention is to provide novel means in combination with a brake assembly for the reduction of noise incident to the operation thereof and to dissipate the heat generated therein to prevent warping of the brake elements.

A further object of the present invention lies in the provision of novel means for eliminating the noise incident to the operation of brakes, particularly those on heavy vehicles, said means being readily applicable to existing brake assemblies already in use at comparatively little cost with the same effect as when applied to brake assemblies at their time of manufacture.

Still a further object of this invention resides in the provision of novel means in combination with a brake assembly on an automotive vehicle wherein the mass of the wheel and the tire employed in connection with the brake assembly is utilized to dampen the vibrations set up by application of the brake.

A more specific object of the present invention is to provide a vibration dampener in the form of an annular spring of a diameter such as to be placed between the brake drum and a member arranged to transfer vibrations away from the brake assembly, the spring being placed under stress proportional to the size of the drum.

Further objects and advantages of the present invention will become apparent from the following description taken in connection with the attached drawing wherein:

Figure 1 is an elevation of a preferred embodiment of the present invention as employed in connection with a wheel assembly on a motor vehicle, a portion of the wheel being broken away to show the brake drum, a portion of the annular resilient member in direct contact therewith, and an annulus of resilient material about the outer periphery of the annular resilient member, the specific embodiment shown by way of example comprising a mechanical two shoe brake.

Figure 2 is a section taken on line 2—2 of Figure 1, showing the manner of incorporating the present invention in a brake assembly wherein a ribbed brake drum is employed, an annulus of resilient material being disposed between the tire rim and the coil spring.

Figure 3 is a view similar to that of Figure 2 except that the annulus of resilient material is disposed between the annular coil spring and the brake drum.

Figure 4 is a view similar to Figures 2 and 3 illustrating a further embodiment of the invention with a conventional brake drum wherein the drum is provided with a slight depression around the outer periphery thereof for retaining the annular coil spring, and the annulus of resilient material is disposed between the spring and the rim of the wheel.

Figure 5 is a view similar to Figures 2 to 4, inclusive, showing a further embodiment of the invention employing an annulus of U-shape between the brake drum and the tire rim.

Referring to Figures 1 and 2 and the preferred embodiment of the invention disclosed therein, the wheel of an automotive vehicle is there shown by way of example to illustrate an application of the present invention. A tire 11 is shown as mounted upon a rim 12, the rim in turn being supported upon a member 13 secured to a disc wheel 14, tire 11 being held in place on rim 12 by a split snap or lock retaining ring 15 which engages a bead 16 of the tire after inflation. The opposite bead 17 of the tire is held in place by flange 18 on rim 12.

The brake assembly shown in Figures 1 and 2 is of somewhat conventional character and comprises a cam shaft 19 mounted on an axle shaft housing (not shown) and arranged to be actuated by any suitable means. A brake cam 21 is secured to rotate with shaft 19 and during its rotation engages cam plates 22 secured to brake shoes 23 by tongue and groove connections shown at 24. Shoes 23 are supported in the usual manner from a back plate 29.

Brake linings 25 are secured to brake shoes 23 by rivets or other suitable means. Brake shoes 23 are formed with lugs 26, preferably integral therewith, which are connected by a pull back spring 27 for the purpose of pulling the brake shoes and their attached linings together and back from a surrounding brake drum 28 when the brakes are released to eliminate brake drag.

In the form of the invention shown in Figures 1 and 2, brake drum 28 is formed with a series of ribs as shown at 31. As will be noted in Figure 2, rim 12 and disc 14 are mounted in a manner to be spaced from the outer periphery of drum 28. Fitted within this space and partially in a groove 32 of brake drum 28 is an annular resilient member or coil spring 33 suitably connected at its ends. Spring 33 is maintained under a predetermined tension which is directly proportional to the size of the brake drum, that is, as the size of the brake increases, the tension on annular coil spring 33 is also increased so that tensional stresses thereon are in proportion to the brake size.

Tightly interposed between annular coil spring 33 and the inner periphery of tire rim 12 is an annulus 34 of resilient material, asbestos or other heat resisting substances being preferably employed by reason of the relatively high temperature which it must withstand. Annulus 34 is particularly useful in dampening high frequency vibrations.

In addition to maintaining a predetermined tension upon coil spring 33, it has also been found desirable to maintain a radial stress thereon in proportion to the size of the brake. Assuming the brake is of relatively large size, the radial stress must be greater than brakes of smaller size, this being due, it is believed, to the fact that the frequency of the vibrations set up is proportional to the size of the brake. Variation in radial stress is preferably obtained by varying the size of the spring employed relative to the space between the brake drum and the surrounding wheel element.

As an example of the radial compression and tension found most suitable for one type of brake, a spring 28½" long (relaxed) and 1⅛" in diameter is employed with a 17¼ x 6 DW brake having a ribbed brake drum. The smallest circumference of the groove with the insulator in place is 58⅝", the tension on the spring in place in the groove being about 30 pounds. The outer diameter of the spring in place is 21.205 inches while the inside diameter of the wheel at the point of spring contact is 21⅛ inches or 21.125 inches, the spring being radially compressed about 0.08 inch.

When the brakes are applied by rotation of cam 21, brake linings 25 are caused to come in contact with the inner periphery of brake drum 28 and as a consequence thereof vibrations are set up. Unless means is provided to quickly dissipate these vibrations, chatter and squealing of the brake will result. In the present invention, as illustrated in Figures 1 and 2, the vibrations are absorbed and dampened by annular coil spring 33 which is in direct contact with the periphery of the brake drum. The dampened vibrations are transmitted from coil spring 33 to resilient annulus 34 which also tends to dampen and dissipate the vibrations. The vibrations are further transmitted to the tire rim 12, disc 14 and the tire 11 which constitute a mass sufficient to completely dampen all the remaining vibrations. Thus the brake operates with a minimum of noise and there is no accompanying chatter and squealing.

Referring to the modification shown in Figure 3, resilient annulus 34 is shown as disposed between brake drum 28 and annular coil spring 33 rather than between annular coil spring 33 and ring 12 as shown in Figure 2. This arrangement has been found to be of particular advantage in that it is especially useful in the field of application of the present invention to the wheels and brake assemblies now in service without a suitable vibration dampener. Obviously it is only a simple step to place an annulus 34 of resilient material in groove 32 of brake drum 28 and to take a coil spring 33 of the proper diameter and proper length to form the annular spring under the desired stresses, thus making a practical and efficient vibration dampener at a minimum cost.

In Figure 4, the invention is shown as embodied in a wheel assembly employing a conventional brake drum 35 wherein a relatively smooth outer surface is provided. If no provision were made thereagainst, there would obviously be a tendency for spring 33 to slip on the brake drum particularly, when the wheel is assembled. To avoid this difficulty, brake drum 35, which normally has a smooth outer surface, is formed with a groove 36 on the outer periphery thereof, the depth of groove 36 being in proportion to the radial pressure to be exerted on coil spring 33. To further maintain spring 33 in position, an annular flange 37 is secured to the outer periphery of brake drum 35. This flange may be integral therewith or may be attached to the brake drum 35 by welding or any other known means. It will be noted that in addition to holding the vibration dampener spring in position, flange 37 also acts as a heat radiating surface for the brake drum and aids in maintaining the temperature of the drum during operation at a minimum thereby preventing warping.

In Figure 5, a further embodiment of the present invention is shown wherein an annulus of U-shaped spring steel 38 is employed in lieu of annular coil spring 33. As shown, spring 38 is generally U-shaped in cross-section and is preferably disposed with the closed end of the U toward the left as viewed in Figure 5. A spring of the type shown at 38 is of advantage in that it is cheaper than a coil spring, it may be made to furnish greater radiating surface, and it facilitates assembly of the wheel and hub when the vibration dampener is incorporated therein. Furthermore, it will be noted that spring 38 contacts both the drum 28 and the resilient material 34 over a greater area than annular coil spring 33 and accordingly transmits vibrations to a greater degree.

It is to be understood that the relative positions of resilient material 34 and annular coil spring 33 or U-spring 38 may be reversed as shown in Figures 2 and 3, either arrangement being satisfactory. It is further to be understood that while the present invention is shown as applied to the wheel of an automotive vehicle, it is capable of other applications in which brakes or like elements are employed and it is intended that the scope of the present application contemplates such application.

In accounting for the success of the present invention, it is believed that of the vibrations of frequencies that cause undesirable noises, vibrations of one range of frequencies are absorbed by the spring, the asbestos strip absorbing vibrations of still another range of frequencies, the remaining vibrations being absorbed by the tire and rim assembly.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake mechanism, a brake drum, a wheel element surrounding said drum and spaced therefrom, resilient means under predetermined stress surrounding said drum, and cushioning means surrounding said resilient means in contact with said wheel element.

2. In a brake mechanism, a brake drum, a wheel element surrounding said drum and spaced therefrom, a coil spring secured about said drum under predetermined tension, and heat resistant cushioning means surrounding said resilient means and in contact with said wheel element.

3. In a brake mechanism, a brake drum having a groove in the periphery thereof, a wheel comprising a rim element surrounding said drum and spaced therefrom, and resilient means in said groove coacting with said rim element to transfer and dampen vibrations between said drum and rim element.

4. In a brake mechanism, a brake drum having a groove in the periphery thereof, a wheel comprising a rim element surrounding said drum and spaced therefrom, cushioning means in said groove, and resilient means supported on said cushioning means and contacting said rim element to transfer and dampen vibrations between said drum and rim element.

5. In a brake mechanism, a brake drum, a wheel comprising a rim element surrounding said drum and spaced therefrom, a coil spring on said drum and coacting directly with said rim element to transfer and dampen vibrations between said drum and rim element, and a flange on said drum to hold said spring in predetermined position.

6. In a brake mechanism, a brake drum, a wheel element surrounding said drum and spaced therefrom, and an annular resilient member with a U-shaped cross-section under predetermined stress and compression between said drum and wheel element to transfer and dampen vibrations therebetween.

7. In a brake mechanism, a brake drum, a wheel element surrounding said drum and spaced therefrom, an annular resilient member with a U-shaped cross-section mounted on said drum, and cushioning means between said member and said wheel element.

8. In a brake mechanism, a brake drum, a wheel assembly concentric with said drum and spaced therefrom comprising a tire, a rim for supporting said tire and a supporting element for said rim, resilient means under predetermined stress surrounding said drum, and cushioning means surrounding said resilient means and in contact with said wheel assembly.

9. In a brake mechanism, a brake drum, a wheel comprising a rim element surrounding said drum and spaced therefrom, resilient means under predetermined stress surrounding said drum, and cushioning means surrounding said resilient means in contact with said rim element.

10. In a brake mechanism, a brake drum, a wheel comprising a rim element surrounding said drum and spaced therefrom, a coil spring secured about said drum under predetermined tension, and heat resistant cushioning means surrounding said resilient means and in contact with said rim element.

11. In a brake mechanism, a brake drum, a wheel comprising a rim element, and means to transmit and dampen vibrations from said drum to said element, said means comprising a resilient means and a cushioning means arranged between and coacting with said drum and said rim element.

ROBERT L. KOEPPEN.
L. RAY BUCKENDALE.